US006598057B1

(12) United States Patent
Synnestvedt et al.

(10) Patent No.: US 6,598,057 B1
(45) Date of Patent: Jul. 22, 2003

(54) METHOD AND APPARATUS FOR GENERATING CONFIGURATION FILES USING POLICY DESCRIPTIONS

(75) Inventors: Erik J. Synnestvedt, Watertown, MA (US); Gregory F. Morris, Nashua, NH (US); Hugh W. Gabrielson, Arlington, MA (US); Joshua B. Littlefield, Wellesley, MA (US); Kenneth I. Oliver, Sharon, MA (US); Phillip T. DiBello, Billerica, MA (US); Richard A. Coco, Georgetown, MA (US); Richard M. Woundy, North Reading, MA (US); Andrew H. Sudduth, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/470,105

(22) Filed: Dec. 22, 1999

(51) Int. Cl.⁷ .............................................. G06F 17/30
(52) U.S. Cl. ...................... 707/200; 709/217; 709/220; 370/352; 370/368
(58) Field of Search ...................... 707/200; 709/217, 709/220; 370/352, 368

(56) References Cited

U.S. PATENT DOCUMENTS

| 5,794,033 | A | | 8/1998 | Aldebert et al. ............. 395/653 |
| 5,822,565 | A | * | 10/1998 | DeRosa, Jr. et al. .... 395/500.45 |
| 6,009,103 | A | * | 12/1999 | Woundy ..................... 370/401 |
| 6,023,464 | A | * | 2/2000 | Woundy ..................... 370/352 |
| 6,061,693 | A | * | 5/2000 | Carney et al. ............... 707/200 |
| 6,170,008 | B1 | * | 1/2001 | Bahlmann et al. .......... 709/220 |
| 6,195,689 | B1 | * | 2/2001 | Bahlmann ................... 709/217 |
| 6,286,038 | B1 | | 9/2001 | Riechmeyer et al. ....... 709/220 |
| 6,374,287 | B1 | | 4/2002 | Goldstein ................... 709/201 |
| 6,393,478 | B1 | | 5/2002 | Bahlmann ................... 709/224 |
| 2001/0019559 | A1 | * | 9/2001 | Handler et al. ............. 370/468 |
| 2002/0003806 | A1 | * | 1/2002 | McKinnon, III et al. ... 370/437 |

OTHER PUBLICATIONS

"Data over Cable Interface Specifications: Cable Modem Termination System—Network Side Interface Specification," MCNS Holdings, L.P. (1996).

"Data–over–Cable Service Interface Specifications: Cable Modem to Customer Premise Equipment Interface Specification," Cable Television Laboratories, Inc. (1998).

* cited by examiner

Primary Examiner—Charles Rones
(74) Attorney, Agent, or Firm—Hamilton, Brook, Smith & Reynolds, P.C.

(57) ABSTRACT

A method and apparatus for generating configuration files using policy descriptions is provided. The present invention provides a method of generating a binary configuration file by receiving an identification encoded filename, parsing the identification encoded filename to determine identification parameters, matching the identification parameters to a set of configuration policy data to create configuration file parameters, and generating the binary configuration file from the configuration file parameters. The identification encoded filename can be can be run through an authentication check to provide increased security. Once created, the binary configuration file can also be validated, providing increased integrity. In one aspect of the present invention implemented is provided on a TFTP server. In another aspect of the invention an LDAP server is queried for certain configuration policy data, the configuration policy data being optionally cached on the TFTP server. The resulting configuration can be generated according to the DOCSIS configuration file standard, including removing non-version applicable DOCSIS configuration file parameters. The present invention can also be used to generate an annotated configuration file from the configuration file parameters, the annotated configuration file being viewable through a user interface.

22 Claims, 5 Drawing Sheets

METHOD AND APPARATUS FOR GENERATING CONFIGURATION FILES USING POLICY DESCRIPTIONS

BACKGROUND OF THE INVENTION

The present invention relates generally to data communications devices and more specifically to the generation of configuration files for data communications devices.

TFTP ("Trivial File Transfer Protocol") is a file transfer protocol implemented on top of the Internet User Datagram protocol (UDP or Datagram). It may be used to copy files between machines on different networks implementing UDP. TFTP is designed to be small and easy to implement. Therefore, it lacks most of the features of a regular FTP. The only thing it can do is read and write files from and to a remote server. It cannot list directories, and has no provisions for user authentication. In common with other Internet protocols, it passes 8 bit bytes of data.

| TFTP supports five types of packets: | |
|---|---|
| opcode | operation |
| 1 | Read request (RRQ) |
| 2 | Write request (WRQ) |
| 3 | Data (DATA) |
| 4 | Acknowledgment (ACK) |
| 5 | Error (ERROR) |

The TFTP header of a packet contains the opcode associated with that packet.

| 2 bytes | string | 1 byte | string | 1 byte |
|---|---|---|---|---|
| Opcode | Filename | 0 | Mode | 0 |

An RRQ packet, as depicted above, would contain an opcode of I and a nullterminated Filename and Mode.

DOCSIS ("Data Over Cable Service Interface Specification") defines technical specifications for equipment at both a subscriber's premises and cable operator headends. A headend is a central distribution point for a coaxial or fiber cable-based transmission system. Signals are received from satellite or other sources, frequencies are converted to appropriate channels, possibly combined with locally originated signals and then rebroadcast to cable subscriber equipment (i.e., cable modems). A cable modem ("CM") provides access to a network by way of a coaxial connection. Cable modems generally provide faster access than conventional telephone line or ISDN modems.

DHCP ("Dynamic Host Configuration Protocol") is a network application protocol that assigns a temporary IP address to a network device automatically when the network device connects to the network.

LDAP (Lightweight Directory Access Protocol") is a network application protocol (designed to work on TCP/IP stacks) used to read and write information from a data store. LDAP is a "lightweight" version of the X.500 specification, it gives client applications the ability to store and retrieve network configuration information, such as a user name, e-mail address, security certificate, or other contact information.

IEEE has developed a set of standards to define methods of access and control on local area networks. The IEEE 802 standards correspond to the physical and data-link layers of the ISO Open Systems Interconnection model, but they divide the data-link layer into two sublayers. The logical link control (LLC) sublayer applies to all IEEE 802 standards and covers station-to-station connections, generation of message frames, and error control. The media access control (MAC) sublayer, dealing with network access and collision detection, differs from one IEEE 802 standard to another: IEEE 802.3 is used for bus networks that use CSMA/CD, both broadband and baseband, and the baseband version is based on the Ethernet standard. IEEE 802.4 is used for bus networks that use token passing, and IEEE 802.5 is used for ring networks that use token passing (token ring networks). In addition, IEEE 802.6 is an emerging standard for metropolitan area networks, which transmit data, voice, and video over distances of more than five kilometers.

CMTS ("Cable Modem Termination Service") is a head-end device than can act as a cable modem router.

Typically, a computer network providing cable modem access is configured with a host computer connected to a cable modem either directly or through an Ethernet connection. The cable modem is ultimately connected to a CMTS, the CMTS provides access to other networks (e.g., the Internet) and servers (e.g., TFTP, LDAP, DHCP) attached to the networks.

Cable modems are configured using DOCSIS compliant files typically transferred from a TFTP server. These configuration files are binary files, consisting of a sequence of 8-bit data, as distinguished from files consisting of human-readable ASCII text. Binary files are usually in a form readable only by a program, often compressed or structured in a way that is easy for a particular program to read.

SUMMARY OF THE INVENTION

Managing the DOCSIS compliant configuration files for the many cable modems served by a TFTP server requires a large amount of overhead, both in time and space. The process of updating configuration files as network topology changes is prone to errors due to the large number of cable modems and therefore configuration files that may have to be changed. Additionally, business decisions regarding the various service levels to provide cable modem subscribers are hampered by the complexity and overhead associated with configuration file changes.

Accordingly, a technique is needed to provide improved configuration file management. The present invention provides a method of generating a binary configuration file by receiving an identification encoded filename, parsing the identification encoded filename to determine identification parameters, matching the identification parameters to a set of configuration policy data to create configuration file parameters, and generating the binary configuration file from the configuration file parameters. The identification encoded filename can be can be run through an authentication check to provide increased security. Once created, the binary configuration file can also be validated, providing increased integrity.

In one aspect of the present invention the method is run on a TFTP server. In another aspect of the invention the method involves querying an LDAP server for certain configuration policy data, the configuration policy data being optionally cached on the TFTP server. The resulting configuration can be generated according to the DOCSIS configuration file standard, including removing non-version applicable DOCSIS configuration file parameters when generating the binary configuration file.

The present invention can also be used to generate an annotated configuration file from the configuration file parameters, the annotated configuration file being viewable through a user interface.

In one embodiment the present invention is implemented as a sequence of computer program instructions, these instructions may exist on any computer readable medium, including an electromagnetic wave.

The present invention provides the advantages of allowing for more effective broadband provisioning through better configuration file management as well as allowing for the creation of more flexible subscriber service plans.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. A new TFTP service providing DOCSIS file generation capabilities is described; it supports effective broadband provisioning and improved configuration file management. The new TFTP service generates DOCSIS compliant cable modem configuration files with appropriate classes of service, based upon a request from the cable modem and using user registration information stored in an LDAP directory. The new TFTP service runs on a standard RFC-1350 compliant TFTP server. The TFTP server can also be used to perform standard TFTP services, such as downloading software upgrades to cable modems, as well as providing the new service of dynamically generating DOCSIS compliant configuration files.

Figure 1:
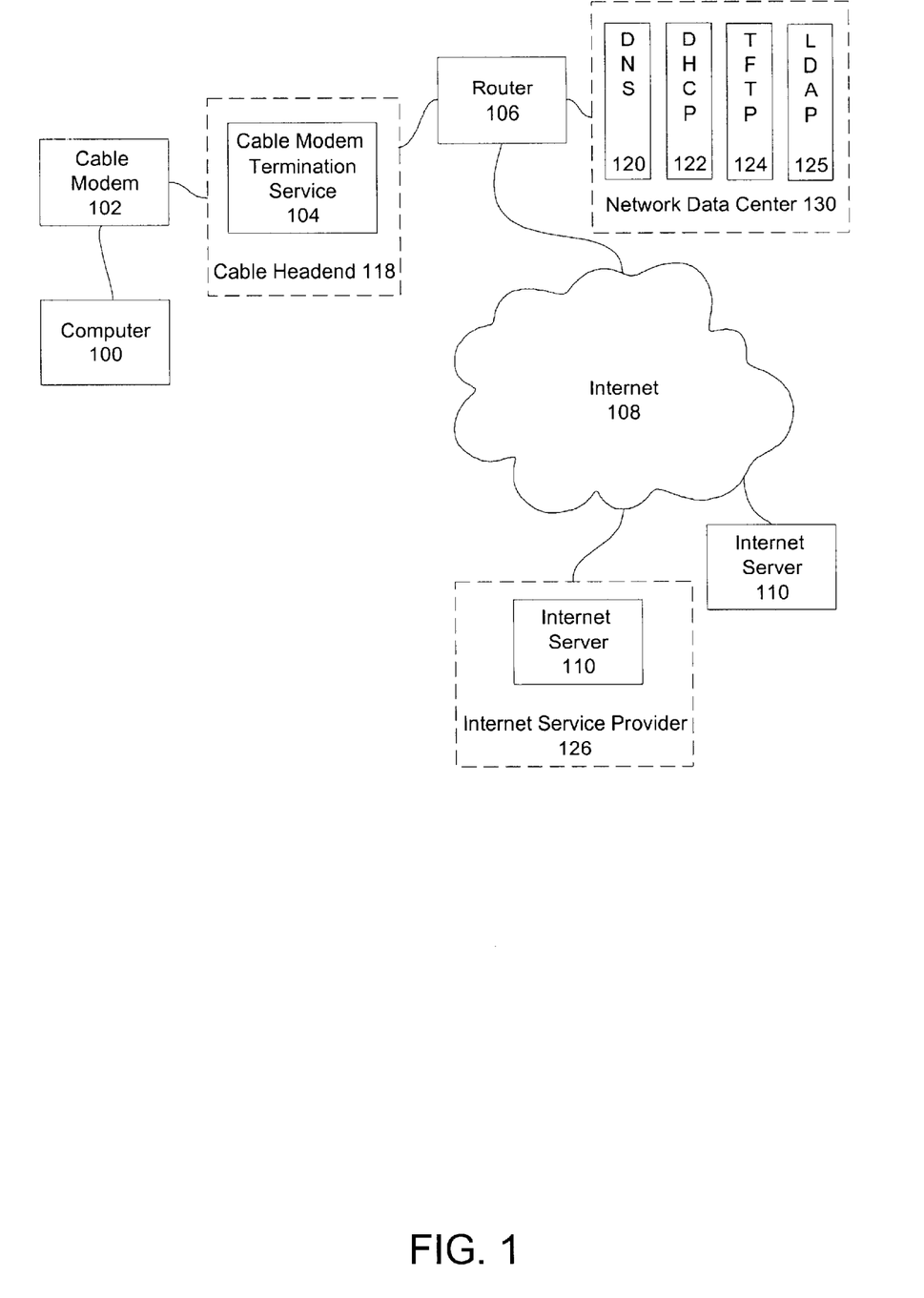
FIG. 1 is a block diagram of a system topology configured according to an embodiment of the present invention.

FIG. 1 is a block diagram of a system topology configured according to an embodiment of the present invention. A computer 100 (e.g., an IBM Personal Computer) is connected via an Ethernet interface to cable modem 102 (e.g., a Cisco Systems uBR904 Cable Modem). The cable modem 102 is connected by coaxial cable to a cable modem termination service 104 (e.g., Cisco Systems uBR7246 Cable Modem Termination Service). The cable modem termination service 104 is housed in a cable headend 118. The cable modem termination service 104 is connected to a router 106 which provides access to network data center 130 which contains a Domain Name Service ("DNS") server 120, a DHCP server 122, a TFTP server 124 and an LDAP server 125. Router 106 also connects cable modem termination service 104 to the Internet 108. Multiple Internet servers 110 are connected to Internet 108 and are therefore accessible by users of computers 100 connected into the topology. Certain Internet servers 110 are maintained by Internet service providers 126. Requests for configuration originate at cable modem 102 and travel to TFTP server 124, where a DOCSIS binary configuration file is generated and sent back to cable modem 102.

Figure 2:
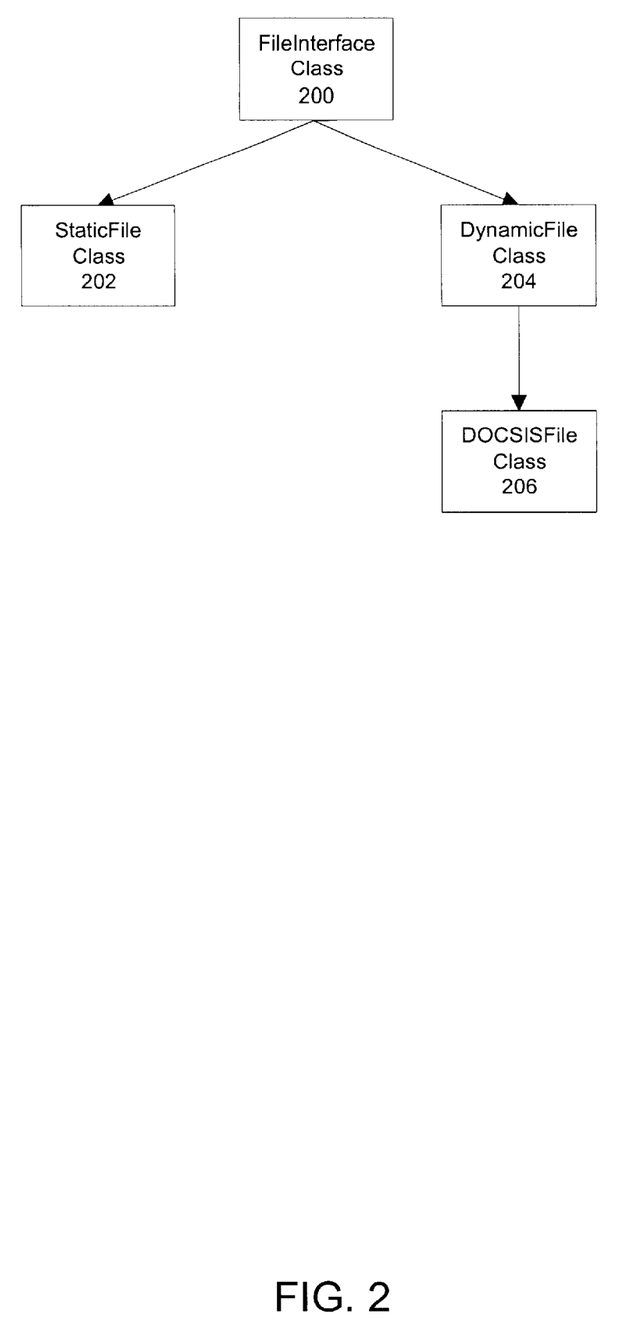
FIG. 2 is a block diagram of the hierarchy of objects of the File class as embodied in the present invention.

FIG. 2 is a block diagram of the hierarchy of objects of the FileInterface class 200 as embodied of the present invention, the following classes define the interfaces the TFTP server 124 will use to access static files and DOCSIS files. The FileInterface class 200 represents a generic file which can be read or written. The StaticFile class 202 inherits from FileInterface class 200, and represents a file that exists in the file system. The DynamicFile class 204 inherits from FileInterface class 200, and represents a file that exists in memory. The DOCSISFile class 206 inherits from DynamicFile class 204, and represents a DOCSIS compliant configuration file.

The FileInterface class 200 provides the basic operations of open, close, read and write. Flavors of open include, read-only, write-only and read-write. Additionally, flags for appending at end-of-file, open and truncating, creating and opening, and opening only if file doesn't already exist, are defined.

The StaticFile class 202 will inherit from the FileInterface class 200. The open method will be responsible for checking access controls on the file being accessed and will return access denied, file not found or OK. Access controls will be checked by matching the filename against the administratively configured TFTP home directory and optional alternate paths. The constructor will take an argument specifying the mode of the file transfer, octet or netascii and perform the appropriate transformation on the file data.

The DOCSISFile class 206 will inherit from the DynamicFile class 204 which inherits from the FileInterface class 200. The purpose of the DynamicFile class 204 is to provide a place to put common methods associated with dynamic or in-memory files allowing the TFTP server 124 to be easily extended to serve other types of dynamic files. The open method will be responsible for contacting the LDAP server via the middleware, verifying the client's IP address, constructing a DOCSIS file image in memory and verifying the integrity of that image. The open method may return access denied, file not found, or OK. DOCSIS files can only be opened for reading. As such, the open call will return access denied if a write flag is passed to the open call. The close method will be responsible for releasing all resources associated with the DOCSIS file. DOCSIS files will not be cached in memory beyond the call to close. The constructor will take an argument specifying the IP address of the client requesting the file. This argument is used for validation as described in the next section.

Figure 3:
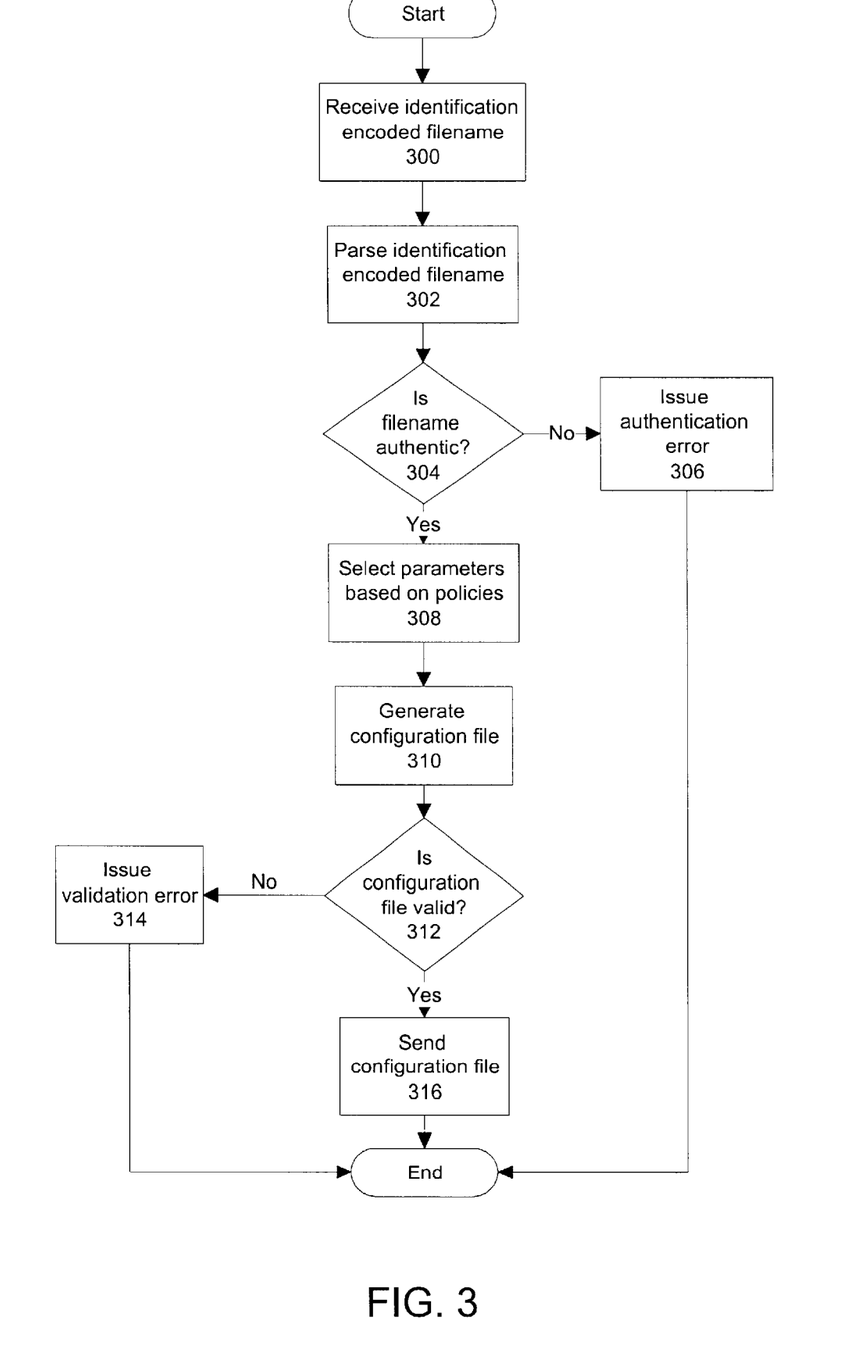
FIG. 3 is a flow diagram showing steps in the configuration file generation process levels as used in an embodiment of the present invention.

FIG. 3 is a flow diagram showing various steps in the configuration file generation process levels as used in an embodiment of the present invention. The binary configuration process receives an identification encoded filename at Step 300. The identification encoded filename identifies the cable modem 102 for which a binary configuration file is to be generated. The identification encoded filename is parsed at Step 302, breaking out its parameters. It is then checked (Step 304) for authenticity. If the filename is not authentic an authentication error is issued at Step 306 and the process ends, otherwise parameters derived from the identification encoded filename and data located in various data stores is matched against policy data (Step 308). Matching consists of locating policy information for various components (e.g., cable modem vendor, subnet, CMTS, CMTS Group and default policies), constructing lists, applying rules and removing non-applicable options. The results of the matching Step 308 generate a binary configuration file (Step 310). The binary configuration is checked for validity at Step 312, if it is found to be invalid a validation error is issued at Step 314, otherwise the binary configuration file is sent to the cable modem in Step 316.

Figure 4:
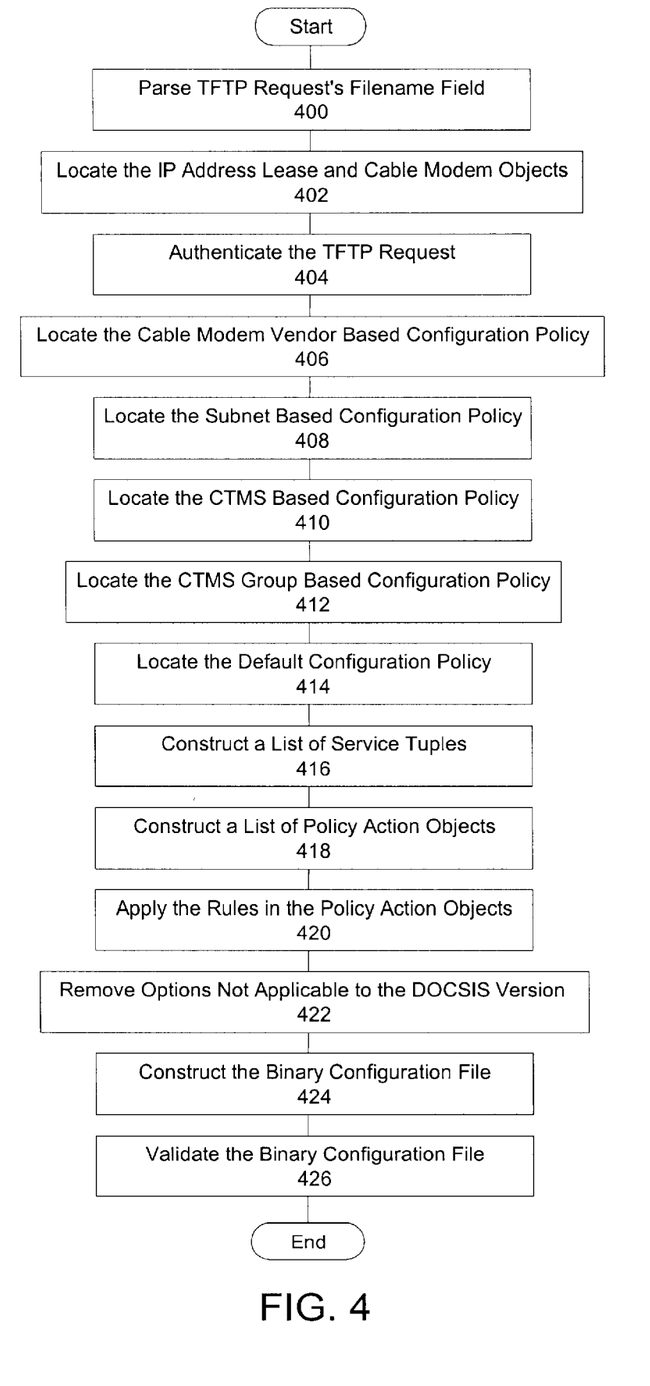
FIG. 4 is a flow diagram showing the various steps performed by a preferred embodiment of the present invention.
Figure 5:
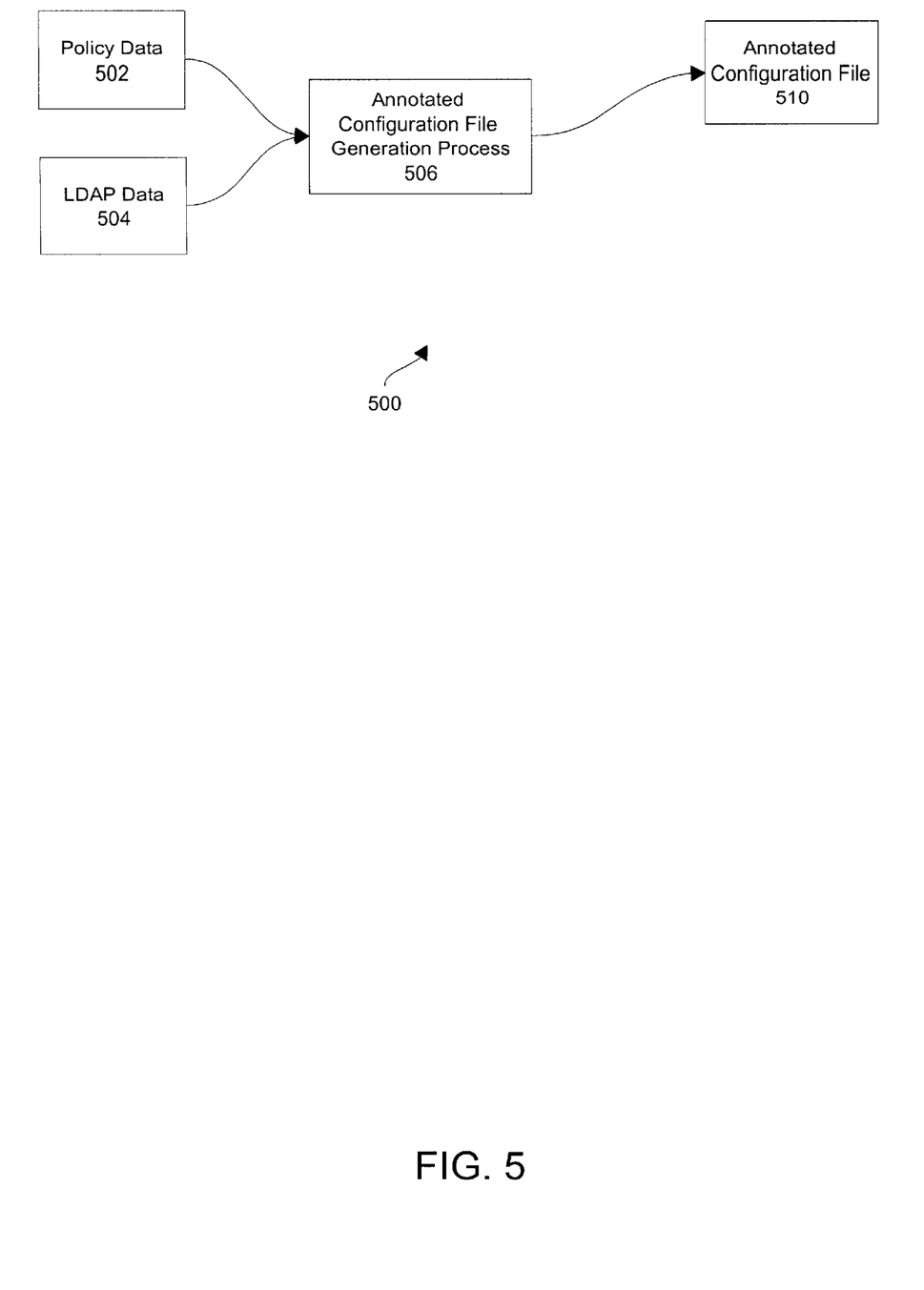
FIG. 5 is a schematic diagram showing the display system of the present invention.

FIG. 4 is a flow diagram showing the various steps performed by a preferred embodiment of the present invention. In a preferred embodiment of the present invention a DOCSIS configuration file is dynamically generated based upon a RRQ message received by an augmented TFTP server 124. The invention can generate a DOCSIS file for the TFTP server 124 (i.e., a binary configuration file) or a DOCSIS file for the display system 500 (an annotated configuration file). If the configuration file generation is being performed on behalf of the TFTP server 124, then directory searches will be confined to the pre-populated LDAP directory snapshot cache except where noted. Steps being used only for directory verification are to confirm the consistency of the configuration information stored in the LDAP directory or cache and are only performed if the debug option to verify configuration information is enabled. If the configuration file generation aborts, then an error message will be written to the message log. Configuration files can be used to define the equipments's operating mode, such as: downstream and upstream service assignments, assigned frequencies, data rates, modulation schemes, class of service, and type of service.

Parse the TFTP Request's Filename Field (Step 400)

The filename contained in a TFTP read request (RRQ) is parsed to determine if the request is for a normal file, or a binary DOCSIS configuration file. The file name to be parsed is composed of a requested filename and a DOCSIS pathname prefix setting (defined in the LDAP server or the DHCP/DNS information backup). Additionally, a message logfile destination and message log level are received. The level of logging is a configurable setting (e.g., log only errors, log errors and warnings). The filename parsing process outputs a status, success if filename is in proper syntax, or failure if the first portion of the filename matches the DOCSIS request prefix, but the remaining portion of the filename does not have the proper syntax. Upon failure a warning message will be logged and the failure status returned. Another output is a DOCSIS request boolean flag, this flag is set to true if the first portion of the filename matches the DOCSIS pathname prefix. Because a DOCSIS filename is formed by the DHCP server 122 no special handling is required for operating system specific filename differences such as drive letters or forward versus backward slashes. The DHCP server 122 will use the exact pathname prefix stored in the LDAP directory. The MAC address of the cable modem that the configuration file is being generated for is also output. The parser performs a case insensitive compare of the next portion of the requested filename against "/MAC-". If the strings match, then extract the remaining portion of the filename and validate that it has the proper format for a MAC Address. If the filename does not pass the tests for a "/MAC-" prefix and valid MAC address, then the parser writes a warning message to the message log (if the desired level of logging information includes warnings) and returns a failure status.

Inputs to the Match and Generate Processes

Inputs to the generation process include a boolean flag indicating the DOCSIS configuration file is being generated on behalf of the TFTP server 124. If the file is being generated for the TFTP server 124, then the generation request will be authenticated and LDAP directory lookups for certain objects will be restricted to the snapshot cache taken at server start-up. Otherwise, the authentication is skipped, the LDAP cache is not pre-populated, and directory lookups may read from the LDAP directory if the object is not found in the cache.

The MAC address of the cable modem for which the DOCSIS configuration file is being generated is received as input and used as the key to locate the cable modem object for this cable modem. The TFTP server 124 obtains the MAC address of the cable modem by parsing the special filename in the TFTP request packet sent by the cable modem.

The source IP address of the TFTP request packet (or 0 if the configuration file is not being generated on behalf of the TFTP server 124) is received by the generation process. The IP address is used to authenticate the DOCSIS configuration file request.

The DOCSIS version of the cable modem is received and used to determine the DOCSIS version the generated configuration file should conform to. This allows the process to ignore old configuration options that are no longer applicable in a configuration file that conforms to a new DOCSIS version, or ignore new configuration options that should not be present in a configuration file that conforms to an old DOCSIS version. The TFTP server 124 and the display system 500 obtain the DOCSIS version from the Version attribute of the cable modem object.

The LDAP connection is used to obtain the cable modem object, the IP address lease object and other objects directly associated with the cable modem object from the LDAP directory, all other objects are obtained from the directory snapshot cache loaded at server start-up.

The LDAP configuration parameters control LDAP access. These include the LDAP search filter, search scope, request time-out, connection count, and LDAP distinguished name ("DN") to get to the object tree containing the cable modem objects. The TFTP server 124 obtains these parameters from its configuration information stored in the LDAP directory (minimal initial LDAP connection parameters are stored in a local configuration database).

The LDAP cache is an in-memory cache of directory objects. When generating a DOCSIS configuration file for the TFTP server 124, the cache is pre-populated with a snapshot of the directory objects needed for DOCSIS configuration file generation (except for Cable modem objects and objects directly associated with a Cable modem object). When generating a DOCSIS configuration file for the display system 500 the cache is only used to speed up access to directory objects and can be empty.

A boolean flag is received, indicating whether directory integrity verification is enabled for checking the contents of directory objects. The TFTP server 124 obtains the value for this flag from the "data-integrity-checking" property stored in a local configuration database.

An indication of which heap to use when dynamically allocating memory is received. The TFTP server 124 will use this parameter to associate dynamically allocated memory with a particular TFTP client session to ensure all the memory is freed at the end of the session.

A message logfile indicating where to write messages to as well as a message log level indicating the level of logging configuration setting (e.g., log only errors, log errors and warnings) is also received.

Outputs From the Match and Generate Processes

An indication of success or failure is output. Since the generation algorithm performs various integrity checks and validations, the configuration file generation may fail.

Another output is the DOCSIS configuration as an in-memory binary file. This is a complete cable modem binary configuration file as described in the DOCSIS Radio Frequency Interface Specification. The file consists of cable modem-specific configuration data stored as a series of configuration settings formed by type, length and value entries. The TFTP server 124 will download the in-memory configuration file to the cable modem. It may also be written to disk for debug tracing. The display system 500 makes no use of the binary configuration file. Creating a binary configuration file from the display system 500 provides a check that the TFTP server 124 will not encounter problems when it generates the binary configuration file.

The DOCSIS configuration as a list of Policy action objects is output. This is a list of Policy action objects indexed by the configuration setting type they represent. The binary configuration file is generated from this list. The list corresponds closely to the binary file, with only automatically generated configuration settings such as the TFTP server Timestamp, CM Message Integrity Service ("MIC"), CMTS MIC, End-of-Data Marker, etc. missing from the list. The TFTP server 124 makes no direct use of the policy action list. The display system 500 uses the policy action list to generate the "list all cable modem options" display. The in-memory configuration file can not be used for this purpose as it only contains the actual configuration settings. In addition to the settings, the "list all cable modem options" display provides information about the policies that caused the particular configuration setting to be generated. It is this information that the policy action objects provide.

Locate the IP Address Lease and Cable Modem Objects (Step 402)

Search the LDAP directory for an IP address lease object and a cable modem object, where each object's MAC address attribute matches the MAC address of the cable modem for which the configuration file is to be generated. The search must bypass the directory cache and go directly to the LDAP directory, otherwise the updates to the objects made by the DHCP server 122, or by other servers, may not be seen. If an IP lease address object is not found, or if a cable modem object is not found, then the configuration file is not generated, an informational message is logged, and a failure status is returned indicating an object representing the IP address lease and/or cable modem could not be located. In this event, the TFTP server 124 will ignore the request, forcing the cable modem to retry later. If multiple IP address lease objects are returned by the search, then the most recently updated IP address lease object is chosen. If multiple Cable modem objects are returned by the search, then the LDAP directory or cache is corrupt, and the configuration file generation aborts.

Authenticate the TFTP Request (Step 404)

If the DOCSIS configuration file is being generated based upon a TFTP request from a cable modem, rather than for display in the display system 500, then an attempt is made to detect the case where a rogue cable modem tries to configure itself with options reserved for another cable modem.

First, verify the network address list type, this step is only for directory verification. The network address list type is obtained from the IP address lease object, it specifies the format of the IP address contained in the network address list. Confirm that the network address list type exists and has a value of 0. If this check fails, then the directory or cache is corrupt and the configuration file generation aborts.

Obtain the IP address of the cable modem and verify network address list, this step is only for directory verification. Confirm that only one value is present in the network address list obtained above. Confirm that the value parses as a legal IP address in CIDR format. If either of these checks fail, then the directory (or cache) is corrupt and the configuration file generation aborts.

Validate the source IP address of the TFTP request by comparing the source address of the TFTP request to the IP address of the cable modem obtained from the IP address lease object. If the addresses do not match, then the configuration file is not generated, an informational message is logged, and a status is returned indicating the request could not be authenticated. If the addresses do not match, then one of two conditions is present. Either the DHCP server 122 has not yet updated the cable modem object with this cable modem's current information or a rogue cable modem is trying to configure itself with options reserved for another cable modem. In either event, the TFTP server 124 will ignore the request, forcing the cable modem to retry later.

Locate the Cable Modem Vendor Based Configuration Policy (Step 406)

Extract the cable modem's vendor prefix from the cable modem's MAC address. The vendor prefix is the three octet prefix of the MAC address. First, locate the dictionary entry for the cable modem's vendor prefix and search for a dictionary entry object whose dictionary entry type is "vendor" and whose dictionary entry data value contains the vendor prefix specified in the MAC address. If a vendor entry is not found for the prefix an informational message is logged and the configuration file generation proceeds without a vendor based configuration policy. This differs from other policy lookups which abort the file generation if a directory object can not be found. A missing vendor based policy is allowed since the vendor of the cable modem may be under the control of the subscriber, whereas other policy objects are based on items controlled by the Multiple Service Organization ("MSO"). If multiple dictionary entry objects are returned by the search, then the directory or cache is corrupt, and the configuration file generation aborts.

Obtain the vendor name associated with the vendor prefix by obtaining the value of the dictionary entry name from the dictionary entry object (this should be the unique vendor name). If the dictionary entry name attribute is not present, or the attribute does not have a value, or the value is an empty string, then the directory or cache is corrupt, and the configuration file generation aborts.

Locate the vendor modem provision object by searching for a vendor modem provision object whose element name value matches the unique vendor name obtained from the dictionary. If a vendor modem provision object is not found for the vendor name an informational message is logged and the configuration file generation proceeds without a vendor based configuration policy. If multiple vendor modem provision objects are returned by the search, then the LDAP directory or cache is corrupt, and the configuration file generation aborts.

Verify that element type is present and has a value of "Vendor". If this check fails, an error is logged and the configuration file generation aborts in error.

Locate the Subnet Based Configuration Policy (Step 408)

Locate the subnet based configuration policy by first locating the subnet modem provision object by searching for a subnet modem provision object whose network address list attribute contains an IP address/mask that matches the bits of the cable modem's IP address. The search may return multiple subnet modem provision objects as subnets can overlap. If multiple objects are returned, they are sorted by mask and the object with the largest mask (and therefore smallest subnet) is selected. Second, verify the element type contains the required value of "Subnet" and confirm the network address list type attribute of the subnet modem provision object is 1. If either of these checks fail, then the directory or cache is corrupt and the configuration file generation aborts.

Locate the CTMS Based Configuration Policy (Step 410)

Obtain a reference to the CMTS modem provision object via the parent element attribute value from the subnet modem provision object previously located. If the parent element attribute is not present, or the attribute does not have a value, or the value is an empty string, then the directory or cache is corrupt and the configuration file generation aborts.

Locate the CMTS modem provision object using the distinguished name obtained from the parent element in the previous step. If a CMTS modem provision object is not found or if multiple CMTS modem provision objects are found, then the directory or cache is corrupt and the configuration file generation aborts.

Verify the element type a value of "CMTS". If this check fails, then the directory or cache is corrupt and the configuration file generation aborts.

Locate the CTMS Group Based Configuration Policy (Step 412)

Obtain the parent element attribute value from the CMTS modem provision object located in the previous section. If the parent element attribute is not present, or the attribute does not have a value, or the value is an empty string, then the directory or cache is corrupt and the configuration file generation aborts.

Locate the CMTS group modem provision object by searching for a CMTS group modem provision object using the distinguished name obtained from the parent element in the previous step. If a CMTS group modem provision object is not found or if multiple CMTS group modem provision objects are found, then the directory or cache is corrupt and the configuration file generation aborts.

Confirm the CMTS group modem provision's element type attribute has a value of "CMTS Group". If this check fails, then the directory or cache is corrupt and the configuration file generation aborts.

Locate the Default Configuration Policy (Step 414)

Search for the system default modem provision object. If the System default modem provision object is not found or if multiple system default modem provision objects are found, then the directory or cache is corrupt and the configuration file generation aborts.

Verify element type contains and element name attributes have a value of "SystemDefault". Confirm the parent element attribute has a null value. If any of these checks fail, then the directory or cache is corrupt and the configuration file generation aborts.

Construct a List of Service Tuples (Step 416)

Start by creating an empty list of service tuples for the cable modem we are configuring. Obtain the package list attribute values from the cable modem object. The attribute may be missing, or may have no value, or may be an empty value. This is the case if the subscriber is booting the cable modem for the first time and obtaining a limited-use configuration for access to the user registration process. If a default package list has been specified for unprovisioned modems, then that list will be used, otherwise the list of packages will be empty. If no service packages are found, continue the configuration file generation at the next phase ("Construct a List of Policy action Objects").

Locate the service tuples for each service package and for each service package: locate the dictionary entry object whose dictionary entry type attribute value is "service-package" and whose dictionary entry name attribute matches the name of the service package. If a Dictionary entry object is not found, or multiple objects are found, then the directory or cache is corrupt and the configuration file generation aborts. Obtain the dictionary entry data attribute values from the dictionary entry object. This is the list of service type and service level tuples required to support the service package. If the dictionary entry data attribute is not present, or the attribute has no value, or the value is empty, then the directory or cache is corrupt and the configuration file generation aborts. Append these values to the list of service tuples for the cable modem being configured and continue to process the next service package obtained from the cable modem object.

Construct a List of Policy Action Objects (Step 418)

Policies are applied to the list of service tuples to form a list of policy action objects. First, create an empty list of policy action objects for the cable modem being configured. Then, for the system default modem provision, CMTS group modem provision, CMTS modem provision, subnet modem provision, vendor modem provision and cable modem objects obtained in the previous steps, in the order given, perform the following:

Obtain the policy list attribute value from the modem provision objects or cable modem object. If the policy list attribute is not present, or the attribute does not have a value, or the value is empty, then continue with the next modem provision objects or cable modem object.

Apply the policies by performing the following for each of the values obtained from the policy list attribute:

Locate the modem provision policy by searching for a modem provision policy object using the distinguished name obtained from the policy list attribute value in the previous step. If the configuration file generation is being performed on behalf of the TFTP server 124, then the search will be confined to the pre-populated LDAP cache, unless the current list of policies came from the cable modem object, in which case the cache is bypassed and the LDAP directory is searched directly. This is done for the all of the searches in this section and allows the TFTP server 124 to access policy objects that are directly associated with the cable modem the configuration file is being generated for. If a modem provision policy object is not found or if multiple objects are found, then the directory or cache is corrupt and the configuration file generation aborts.

Check for a disabled policy by obtaining the policy enabled attribute. If the attribute is present and the value is FALSE, then ignore this policy and continue the configuration file generation with the next policy in the list.

Obtain the policy condition set attribute from the modem provision policy object. If the policy condition set attribute is not present, or the attribute does not have a value, or the value is an empty string, then the LDAP directory or cache is considered corrupt, an error message is logged, and the configuration file generation aborts in error.

Verify that the policy condition set attribute has the required form by verifying that it contains one and only one value. If this check fails, then the directory or cache is corrupt and the configuration file generation aborts.

Locate the policy condition object by searching with the distinguished name obtained from the policy condition set attribute value in the previous step. If a policy condition object is not found or if multiple objects are found, then the directory or cache is corrupt and the configuration file generation aborts.

Obtain the policy constraint attribute values of the policy condition object. If the policy constraint attribute is not present, or the attribute does not have a value, or the value is an empty string, then the directory or cache is corrupt and the configuration file generation aborts.

Determine if the policy should be applied for each of the values obtained from the policy constraint attribute, confirm that the value is "COMMON", or it matches one of the service type, service level pairs in the service tuple list previously created. If any of the constraints fail, then ignore this modem provision policy object and continue the configuration file generation with the next policy in the list.

Obtain the policy action set attribute values of the modem provision policy object. If the Policy action set attribute is not present, or the attribute does not have a value, or the value is an empty string, then the directory or cache is corrupt and the configuration file generation aborts.

Apply the policy for each of the values obtained from the policy action set attribute. First, locate the policy action object by searching for a policy action object using the distinguished name obtained from the policy action set attribute value in the previous step. If a policy action object is not found or if multiple objects are found, then the directory or cache is corrupt and the configuration file generation aborts. Then, append the policy action object to the list of policy action objects for the cable modem being configured and process the next value obtained from the policy action set attribute.

Process the next policy in the list obtained from the policy list attribute. Finally, process the next provision object or cable modem object.

Apply the Rules in the Policy Action Objects (Step 420)

Collect all the policy action objects for a particular modem option and apply the rules. Create an empty array to be used for mapping a major modem option number to a list of policy action objects. For each policy action object in the list constructed in the previous phase perform the following:

Obtain the modem option number by obtaining the first option data attribute value. If the option data attribute is not present, or the attribute does not have a value, or the value is an empty string, then the directory or cache is corrupt and the configuration file generation aborts. Extract the major option number from the "option number=value" string contained in the attribute. Confirm the modem option number obtained is greater than or equal to 0 and less than or equal to 255. If this check fails, then the directory or cache is corrupt and the configuration file generation aborts.

Verify the option specified is configurable by the administrator by confirming that the number is not 0 (Pad), 6 (CM MIC), 7 (CMTS MIC), 14 (CPE Ethernet MAC Address), 19 (TFTP Server Timestamp), 20 ( TFTP Server Provisioned Modem Address), or 255 (End-of-Data). Encodings for these configuration settings will be created when the configuration file is generated and can not be specified by the administrator. If any of the checks fail, then the directory or cache is corrupt and the configuration file generation aborts.

Apply this policy action object by doing the following:

Check for an empty list in map, if there is not already an entry in the major option number to policy action list map for this number, then add this policy action object to the map and continue the configuration file generation with the next policy action object in the list constructed in the previous phase.

Locate the dictionary entry for the option by searching for a dictionary entry object whose dictionary entry type attribute is "option" and whose dictionary entry name attribute value contains the option number. If multiple dictionary entry objects are returned by the search, then the directory or cache is corrupt and the configuration file generation aborts.

Obtain the sub-option and multi-value properties of the option, by obtaining the second and third values of the dictionary entry data attribute from the dictionary entry object. If the dictionary entry name attribute is not present, or the attribute does not have a value, or the value is an empty string, then the directory or cache is corrupt and the configuration file generation aborts.

Check for option suppression. If a policy action object with a suppress rule is already present, then the current policy action object can be discarded no matter what its rule is. Check for this case before looking further at the current Policy action object. If the option has sub-options but is not multi-valued, then rules apply to individual sub-options and each policy action object must be checked. Starting at the end of the list, for each policy action object in the list map for this major option number, obtain the complete option number from the value of the option data attribute. If the complete option number matches the complete option number of the policy action object being processed, then obtain the value of the option operand of the policy action object in the list map, otherwise proceed to the next Policy action object in the list. If the rule given in the option operand is "S", then discard the current policy action object and continue the configuration file generation with the next object in the list constructed in the previous phase, otherwise the sub-option is not suppressed, proceed to the next step. If the option does not have sub-options or is multi-valued, then rules apply to all instances of the option. Obtain the option operand attribute value from the last policy action object in the list map for this major option number. If the rule is "S", then discard the current policy action object and continue the configuration file generation with the next policy action object in the list constructed in the previous phase.

Obtain the modem option rule by obtaining option operand attribute value from the Policy action object. If the option operand attribute is not present, or the attribute does not have a value, or the attribute has multiple values, or the value is an empty string, then the directory or cache is corrupt and the configuration file generation aborts.

Verify the modem option rule by confirming the value is "R" (Replace), "A" (Append), or "S" (Suppress). If the option is not multi-valued, confirm the value is not "A". If any of these checks fail, then the directory or cache is considered corrupt and the configuration file generation aborts.

Apply the Rule, if the rule is "A" or "S", then append the policy action object to the list in the map for this option number and continue the configuration file generation with the next policy action object in the list constructed in the previous phase. Otherwise, the rule is "R". If the option has sub-options but is not multi-valued, then rules apply to individual sub-options and each policy action object must checked. Scan the object list in the map and remove policy action objects whose complete option number match the complete option number of the object being processed. Append the policy action object being processed to the end of the list. Otherwise, the replace rule applies to all instances. Empty the object list in the map for this option number and insert the policy action object in the empty list.

Process the next policy action object in the list constructed in the previous phase.

Remove Options Not Applicable to the DOCSIS Version (Step 422)

Obtain the DOCSIS version of the cable modem by obtaining the value of the DOCSIS version attribute (originally from the the Vendor Class Identifier option in the DHCP message) of the IP address lease object previously located. If the attribute is not present, or does not have a value, or the value is the empty string, then use 1.0 as the DOCSIS version of the cable modem. If the DOCSIS version attribute has multiple values, or the value can not be parsed as a "<major>.<minor>" DOCSIS version number, then the directory or cache is corrupt and the configuration file generation aborts.

Obtain the DOCSIS version of the CMTS by obtaining the value of the DOCSIS version attribute of the CMTS modem provision object previously located. If the DOCSIS version attribute is not present, or does not have a value, or the value is the empty string, then the DOCSIS version for the CMTS is obtained from the CMTS group modem provision object previously located. If it is not possible to obtain the DOCSIS version from the CMTS group, then the directory or cache is corrupt and the configuration file generation aborts.

Determine the DOCSIS version to use by comparing the DOCSIS version of the cable modem to the DOCSIS version of the CMTS and select the minimum of the two as the DOCSIS version the configuration file should conform to.

Remove options not applicable to the DOCSIS version by performing the following steps for each non-empty entry in the modem option number to policy action object list map constructed in the previous phase. First, locate the dictionary entry for the option by searching for a dictionary entry object whose dictionary entry type attribute is "option" and whose dictionary entry name attribute value contains the option number. If multiple dictionary entry objects are returned by the search, then the directory or cache is corrupt and the configuration file generation aborts. Second, obtain the DOCSIS version applicability of the option by obtaining the value of the dictionary entry data attribute from the Dictionary entry object. If the dictionary entry name attribute is not present, or the attribute does not have a value, or the value is an empty string, then the directory or cache is corrupt and the configuration file generation aborts. Third, remove the option if it is not applicable by comparing the DOCSIS version requirements of the option to the DOCSIS version to which the configuration file being generated must conform. If the option is not applicable, then empty the policy action object list for this option number in the map. Lastly, process the next non-empty entry in the modem option number to policy action object list map.

Construct the Binary Configuration File (Step 424)

Create the tag-length-value ("TLV")" entries for the configured options by creating an empty element array to be used for mapping a modem option number to the offset in the binary configuration file of the last TLV entry created for that option (this will be used when generating the CMTS MIC). For each non-empty entry in the modem option number to policy action object list map, traverse the list of policy action objects performing the following steps:

First, skip suppressed options by obtaining the option operand attribute value from the policy action object. If the option operand attribute is not present, or the attribute does not have a value, or the attribute has multiple values, or the value is an empty string, then the directory or cache is corrupt and the configuration file generation aborts. If the value is "S", proceed to the next policy action object. Obtain the modem option values by obtaining the option data attribute values from the policy action object. If the option data attribute is not present, or the attribute does not have a value, or the value is an empty string, then the directory or cache is corrupt and the configuration file generation aborts. Construct the TLV entries starting at the major option number level, for each option data attribute value perform the following:

Locate the dictionary entry for the option format by extracting the complete option or sub-option number from the "option number=value" string contained in the attribute value, if the number of sub-option levels contained in the option number is greater than the option level being processed, then recurse to build a TLV for the sub-option, if the number of sub-option levels contained in the option number is less than the option level being processed, then the end of a sub-option value has been reached, return to the caller. If any of the higher level option numbers have changed, then the end of the option value has been reached, return to the caller. If the option number at the current level is less than or equal to the previous option number, then the end of the option value has been reached, start a new TLV entry and continue processing.

Locate the dictionary entry for the option format by searching for a dictionary entry object whose dictionary entry type attribute is "option-format" and whose dictionary entry name attribute value contains the complete option number. If multiple dictionary entry objects are returned by the search, then the directory or cache is corrupt and the configuration file generation aborts.

Obtain the option format by obtaining the value of the dictionary entry data attribute from the Dictionary entry object. If the dictionary entry name attribute is not present, or the attribute does not have a value, or the value is an empty string, then the directory or cache is corrupt and the configuration file generation aborts.

Generate the TLV entry by extracting the option value from the "option number=value" string contained in the option data attribute. Using the option format information encode the option value into a type, length and value entry and append it to the in-memory binary configuration file (or parent TLV if processing a sub-option). Multi-octet values are encoded in network-byte order, i.e., the octet containing the most-significant bits is first. If this TLV is at the outer level, update the major modem option number to file offset map to reflect the TLV entry that was just added.

Continue processing with the next value of the option data attribute and continue processing with the next policy action object either from the current list, or from the next list in the option array.

Second, generate the CPE Ethernet MAC address entries by obtaining the values of the computer list attribute of the cable modem object. These values are references to customer premise equipment objects. For each value, locate the customer premise equipment object by searching for a customer premise equipment object using the distinguished name obtained from the computer list attribute. If multiple customer premise equipment objects are returned by the search, then the directory or cache is corrupt and the configuration file generation aborts. Next, obtain the MAC address by obtain the value of the MAC address attribute of the customer premise equipment object. If the MAC address attribute is not present, or the attribute does not have a value, or the value is an empty string, then the directory or cache is corrupt and the configuration file generation aborts. Then, generate a TLV entry of type 14 (CPE Ethernet MAC address) and length 6 with the MAC address as the value and append it to the in-memory binary configuration file and process the next value in the list obtained from the computer list attribute.

Third, generate the TFTP server timestamp by obtaining the number of seconds since 00:00 L Jan. 1900 (i.e., RFC-868 time). Generate a TLV entry of type 19 (TFTP server timestamp) and length 4 with the number of seconds as the value and append it to the in-memory binary configuration file.

Fourth, generate the TFTP server 124 provisioned modem address by obtaining the value of the network address list attribute of the cable modem object and encode it into a binary value in network format (this is the IP address of the cable modem). Generate a TLV entry of type 20 (TFTP server provisioned modem address) and length 4 with the IP address of the cable modem as the value and append it to the in-memory binary configuration file.

Fifth, generate the CM MIC by declaring a local variable of type $MD5_{13}$ CTX, then call MD5Init to initialize the variable (See RFC 1321: The MD5 Message-Digest Algorithm for more information on MD5 related functionality). Call MD5Update passing the MD5 context variable, a pointer to the start of the buffer containing the TLV binary values, and the length of the buffer. Call MD5Final passing the context variable to generate the MD5 digest. The MD5 digest value is contained in the digest field of the context variable and is 16 bytes long. Generate a TLV entry of type 6 (cable modem message integrity check), length 16, with the MD5 digest as the value and append it to the in-memory binary configuration file.

Sixth, generate the CMTS MIC using the HMAC-MD5 mechanism described in RFC-2104. It is calculated only over the following configuration settings (when present) and in the order shown:

TABLE 1

Options Included in CMTS MIC

| Type | Description |
|---|---|
| 1 | Downstream Frequency |
| 2 | Upstream Channel ID |
| 3 | Network Access Control |
| 4 | Class of Service |
| 17 | Baseline Privacy Configuration Settings |
| 43 | Vendor-specific Information |
| 6 | CM MIC |
| 18 | Maximum Number of CPEs |
| 19 | TFTP Server Timestamp |
| 20 | TFTP Server Provisioned Modem Address |
| 22 | Upstream Packet Classification |
| 23 | Downstream Packet Classification |
| 24 | Upstream Flow Scheduling |
| 25 | Downstream Flow Scheduling |
| 28 | Maximum Number of Classifiers |
| 29 | Privacy Enable |
| 26 | Payload Header Suppression |

Obtain the shared secret attribute from the CMTS modem provision object previously located. If the CMTS modem provision object is not present, or does not contain a shared secret attribute that has a non-empty value, then obtain the shared secret attribute from the CMTS group modem provision object previously located. If the shared secret attribute is not present, or the attribute does not have a value, or the value is an empty string, then the directory or cache is corrupt and the configuration file generation aborts. Declare a local array variable to hold pointers to the TLV entries in the binary file for the configuration settings listed in the table above. Declare a second local array to hold the corresponding lengths of the configuration settings (the length includes the type and length bytes). Fill in these arrays using the major option number to file offset map created when the configuration file was generated. Declare a local variable to hold the HMAC-MD5 digest. Call $seclib_{13}$ $hash_{13}$ passing the array of buffer pointers, the array of buffer lengths, the number of buffers, the key (from shared secret), the key length, and the output buffer and length to return the HMAC-MD5 digest in. Generate a TLV entry of type 7 (CMTS message integrity check), length 16, with the HMAC-MD5 digest as the value and append it to the in-memory binary configuration file.

Seventh, add an end-of-data marker to terminate the binary configuration file by generating a special TLV entry that only contains the type field which is set to 255 (end-of-data) and append it to the in-memory binary configuration file.

Validate the Binary File (Step 426)

Validate that the configuration settings meet the requirements given by the option-rule and option-format entries in the data dictionary. Create an empty list of complete option numbers appearing in the configuration file (this will be used to check for multiple occurrences of options that can not be repeated). Additionally, validate that the mandatory configuration settings are present. For each mandatory option, confirm the major option number is present in the list of complete option numbers that appear in the file. If this check fails, then the configuration file is invalid and the configuration file generation aborts.

Starting at the major option number level, for each TLV entry perform the following:

Obtain the type from the TLV entry. Check and see that a sub-option is being processed and the end of the parent TLV has been reached. If this is the case, then return from the recursive processing of the sub-options. Read the type octet from the file. If the type octet can not be read because end-of-file has been reached, then an end-of-data marker is missing, the file is invalid, and the configuration file generation aborts.

Validate that the sub-option combination rules are obeyed. If the end of a parent TLV has been reached, then the bit-map of sub-options present in the TLV must be validated against the option rules.

Locate the dictionary entry for the option rules by searching for a dictionary entry object whose dictionary entry type attribute is "option-rule" and whose dictionary entry name attribute value contains the complete option number. If multiple dictionary entry objects are returned by the search, then the directory or cache is corrupt and the configuration file generation aborts.

Check the bit-map against the rules. For the required sub-option rule, confirm the bit-map indicates the sub-option is present for each of the sub-options listed in the rule. For the co-dependent sub-option rule, check the first sub-option listed in the rule, if the bit-map indicates the sub-option is present, then confirm that all the other sub-options listed in the rule are also present, otherwise confirm the others are not present. For the co-destructive sub-options, count the number of sub-options listed in the rule the bit-map indicates are present. Confirm this count is not greater than one. If any of the checks fail, then the configuration file is invalid and the configuration file generation aborts.

Check for end-of-data marker. If the type is 255, then the end of the configuration settings has been reached. Confirm the major option level is being processed (an end-of-data marker can not appear in a sub-option), an end-of-file has been reached, or all remaining bytes in the file are 0 (Pad configuration setting). If any of the checks fail, then the configuration file is invalid and the configuration file generation aborts.

Check for pad configuration setting. If the type is 0 (pad configuration setting), then the configuration file is invalid and the configuration file generation aborts. The pad configuration setting can only appear after the end-of-data marker.

Locate the dictionary entry for the option by searching for a dictionary entry object whose dictionary entry type attribute is "option" and whose dictionary entry name attribute value contains the complete option number. If multiple dictionary entry objects are returned by the search, then the directory or cache is corrupt and the configuration file generation aborts.

Obtain the option properties by obtaining the values of the dictionary entry data attribute from the Dictionary entry object. If the dictionary entry name attribute is not present, or the attribute does not have a value, or the value is an empty string, then the directory or cache is corrupt and the configuration file generation aborts.

Validate the length in the TLV entry. Read the length octet from the file. If the length octet can not be read because end-of-file has been reached, or a sub-option is being processed and there are no more bytes in the parent TLV entry, then the file is invalid, and the configuration file generation aborts. DOCSIS requires that the length of a TLV entry be between 1 and 254. Confirm the length value given in the TLV entry is in range. Confirm the length does not extend beyond the end of the configuration file. If this is a sub-option, then confirm the length does not extend beyond the end of the parent TLV entry. Check the option property value to see if this option requires a specific length, if it does, then confirm the length given in the TLV entry matches the required length. If any of the checks fail, then the configuration file is invalid and the configuration file generation aborts.

Determine if the value contains sub-options by check the option "sub-options" property value, if it is "Y", then recurse to validate the TLV entries for the sub-option. While processing the sub-options use a bit-map to record the sub-options that are present.

Validate multiple entries by checking the option "multi-value" property value, if it is "N", then multiple entries for this option must not be present. Search the list of complete option numbers that have already appeared in this file, if a match is found, then the configuration file is invalid and the configuration file generation aborts.

Record this option in the list of options found by entering the complete option number in the list of options found in this configuration file and process the next TLV entry in the configuration file, or in the parent's TLV entry, if sub-options are being validated.

Caching

Not all of the configuration information the generation algorithm needs can be read in at TFTP server 124 start-up and stored in the snapshot cache. The objects that describe a particular cable modem may be created by the DHCP server 122 and modified by the administrator of the DHCP server 122 after the TFTP server 124 has started. For this reason the generation algorithm must read the cable modem objects and objects directly associated with it from the LDAP directory, bypassing any cache. This explains why the snapshot cache can only partially isolate the TFTP server 124 from administrator changes. Any changes made by the administrator to Cable modem directory objects will be immediately visible to the TFTP server 124.

DOCSIS File Logging

Logging of the DOCSIS file to disk is an optional operation, for example to facilitate debugging. The inputs to the DOCSIS file logging process include the DOCSIS in-memory binary configuration file that is to be logged to disk, the MAC Address of the cable modem that the configuration file was created for, a TFTP subdirectory name, the maximum number of logged DOCSIS files to maintain, the message logfile to write messages to, and the level of logging configuration setting.

The outputs from the DOCSIS file logging are the DOCSIS binary configuration file on disk, stored as a disk file in the TFTP subdirectory named during input. The name of the file will be the MAC address in hexadecimal without the separators, prefixed by "CM" and with a ".dcf" suffix. If the file was successfully created and the log level includes activity messages, an activity message will be logged noting the configuration file was saved and specifying the pathname to the file. If any errors are encountered while attempting to create the file (disk full, etc.) an error message will be written to the logfile.

FIG. 5 is a schematic diagram showing the display system 500. The display system 500 generates an annotated configuration file and displays the configuration that would be generated by the TFTP server 124 for a particular cable modem. To insure that the configuration file the display system 500 displays is representative of the one the TFTP server 124 would generate, much of the generation algorithm is shared and results in both a binary configuration file and an annotated configuration file. There are however two differences in the way configuration file generation is performed for the display system 500 verses generation for the TFTP server 124. Since accessing the display system 500 involves supplying an administrator username/password, generation requests from the display system 500 skip the authentication that confirms the request is legitimate. Authentication will only be performed on generation requests that originate from the TFTP server 124. The second difference involves the configuration data that will be used to generate the configuration file. To minimize concurrency issues with changes to configuration information made by an administrator while the TFTP server 124 is running, the TFTP server 124 will upon start-up create a snapshot of much of the configuration information stored in the LDAP directory and restrict its search for configuration information to this snapshot cache when gathering certain information for the configuration file generation. This partially isolates the TFTP server 124 from configuration changes made by a administrator until the server is reloaded and a new snapshot of the directory objects is taken. The display system 500 display is intended to show the configuration file that would be generated using the configuration information that is currently contained in the LDAP directory, so the pre-populated snapshot cache is not present in the display system 500. When generating a DOCSIS configuration file for the display system 500, the LDAP connection will be used to obtain objects from the LDAP directory that are not yet present in the directory cache.

While this invention has been particularly shown and described with references to preferred embodiments thereof, it will be understood by those skilled in the art that various changes in form and details may be made therein without departing from the scope of the invention encompassed by the appended claims.

In one particular embodiment the present invention generates a binary configuration file, received by a cable modem, for the purposes of setting various configuration options in the cable modem. The present invention is not limited to binary files nor to files capable of setting configuration options. For example, software product initialization files can also be set in accordance with the present invention.

What is claimed is:

1. A method of providing a configuration file to a configurable network device capable of sending a source identification encoded filename, comprising the steps of:

receiving the source identification encoded filename from the configurable network device;

parsing the source identification encoded filename to determine identification parameters;

matching the identification parameters to a set of configuration policy data to create configuration file parameters;

generating the configuration file from the configuration file parameters; and sending the configuration file to the configurable network device.

2. The method of claim 1 further comprising the step of: authenticating the source identification encoded filename.

3. The method of claim 1 further comprising the step of: validating the configuration file.

4. The method of claim 1 wherein the steps are executed on a TFTP server, the source identification encoded filename is received from a cable modem and the configuration file is sent back to the cable modem.

5. The method of claim 4 wherein matching further comprises: querying an LDAP server for certain configuration policy data.

6. The method of claim 5 wherein the LDAP configuration parameters are cached on the TFTP server.

7. The method of claim 4 wherein the configuration file is a DOCSIS compliant file.

8. The method of claim 7 wherein non-version applicable DOCSIS configuration file parameters are not included when generating the configuration file.

9. The method of claim 1 further comprising the steps of:

generating an annotated configuration file from the configuration file parameters, the annotated configuration file being viewable through a user interface.

10. The method of claim 1 wherein the configuration file parameters are drawn from a hierarchy of policy elements that correspond to the physical or logical network topology.

11. A configuration file provider apparatus responsive to a configurable network device capable of sending a source identification encoded filenme, comprising:

a receiver receiving the source identification encoded filename from the configurable network device;

a parser determining identification parameters from the source identification encoded filename received from the configurable network device;

a matcher matching the identification parameters to a set of configuration policy data to create configuration file parameters;

a generator generating the configuration file from the configuration file parameters; and a sender sending the configuration file to the configurable network device.

12. The apparatus of claim 11 further comprising:

an authenticator authenticating the source identification encoded filename.

13. The apparatus of claim 1 further comprising:

a validator validating the configuration file.

14. The apparatus of claim 11 wherein the parser, the matcher, the generator and the transmitter are components of a TFTP server, the source identification encoded filename is received from a cable modem and the configuration file is sent back to the cable modem.

15. The apparatus of claim 14 wherein the matcher further comprises: a query processor querying an LDAP server for certain configuration policy data.

16. The apparatus of claim 15 wherein the LDAP configuration parameters are cached on the TFTP server.

17. The apparatus of claim 14 wherein the configuration file is a DOCSIS compliant file.

18. The apparatus of claim 17 wherein non-version applicable DOCSIS configuration file parameters are not included when the generator generates the configuration file.

19. The apparatus of claim 11 further comprising:

a reporter generating an annotated configuration file from the configuration file parameters, the annotated configuration file being viewable through a user interface.

20. The apparatus of claim 11 wherein the configuration file parameters are drawn from a hierarchy of policy elements that correspond to the physical or logical network topology.

21. A computer program product comprising:
  a computer usable medium for providing a configuration file to a configurable network device capable of sending a source identification encoded filename;
  a set of computer program instructions embodied on the computer usable medium, including instructions to:
  receive the source identification encoded filename from a the configurable network device;
  parse the source identification encoded filename to determine identification parameters;
  match the identification parameters to a set of configuration policy data to create configuration file parameters;
  generate the configuration file from the configuration file parameters; and
  send the configuration file to the configurable network device.

22. A propagated signal carried on an electromagnetic waveform for providing a configuration file to a configurable network device capable of sending a source identification encoded filename, the signal comprising a set of computer program instructions to:
  receive the source identification encoded filename from the configurable network device;
  parse the source identification encoded filename to determine identification parameters;
  match the identification parameters to a set of configuration policy data to create configuration file parameters;
  generate the configuration file from the configuration file parameters; and
  send the configuration file to the configurable network device.

* * * * *

UNITED STATES PATENT AND TRADEMARK OFFICE
CERTIFICATE OF CORRECTION

PATENT NO.      : 6,598,057 B1
DATED           : July 22, 2003
INVENTOR(S)     : Erik J. Synnestvedt et al.

It is certified that error appears in the above-identified patent and that said Letters Patent is hereby corrected as shown below:

<u>Column 20,</u>
Line 27, delete "filenme" and insert -- filename --.
Line 43, delete "1" and insert -- 11--.

Signed and Sealed this

Ninth Day of December, 2003

JAMES E. ROGAN
*Director of the United States Patent and Trademark Office*